US012786084B2

(12) United States Patent
Rady et al.

(10) Patent No.: US 12,786,084 B2
(45) Date of Patent: Nov. 3, 2026

(54) IMPACT-DRIVEN MANAGEMENT OF CHANGE REQUESTS IN MOBILE NETWORK

(71) Applicant: RAKUTEN MOBILE, INC., Tokyo (JP)

(72) Inventors: Moataz Rady, Tokyo (JP); Elsayed Abousharara, Tokyo (JP)

(73) Assignee: Rakuten Mobile, Inc., Tokyo (JP)

( * ) Notice: Subject to any disclaimer, the term of this patent is extended or adjusted under 35 U.S.C. 154(b) by 76 days.

(21) Appl. No.: 18/645,516

(22) Filed: Apr. 25, 2024

(65) Prior Publication Data

US 2025/0337667 A1 Oct. 30, 2025

(51) Int. Cl.
*H04L 43/065* (2022.01)
*H04L 41/0823* (2022.01)
*H04L 41/0859* (2022.01)
*H04L 43/0817* (2022.01)

(52) U.S. Cl.
CPC ........ *H04L 43/065* (2013.01); *H04L 41/0823* (2013.01); *H04L 41/0859* (2013.01); *H04L 43/0817* (2013.01)

(58) Field of Classification Search
CPC .......................... H04L 43/0817; H04L 43/065
See application file for complete search history.

(56) References Cited

U.S. PATENT DOCUMENTS

2006/0153090 A1* 7/2006 Bishop .................. G06Q 10/06 370/252
2015/0350015 A1* 12/2015 Clemm ............... H04L 41/0813 709/221
2017/0124060 A1* 5/2017 Johnson .............. H04L 41/0843
2018/0248750 A1* 8/2018 Johnston .................. G06F 8/65
2020/0348947 A1* 11/2020 Thigpen .............. G06F 11/3409
2021/0103840 A1* 4/2021 Kwong .................. G06N 20/00
2022/0150128 A1* 5/2022 Adhav .................. H04L 41/145
2023/0004761 A1* 1/2023 Batta ......................... G06N 3/09
2024/0013123 A1* 1/2024 Latha ............... G06Q 10/06313
2024/0056366 A1* 2/2024 Behera ................ H04L 41/0883
2024/0195692 A1* 6/2024 Liew ....................... H04L 41/16
2024/0311275 A1* 9/2024 Agrawal ............. G06F 11/3624
(Continued)

FOREIGN PATENT DOCUMENTS

WO WO-2025203057 A1 * 10/2025 ......... H04L 41/0866

*Primary Examiner* — Jerry B Dennison
(74) *Attorney, Agent, or Firm* — Sughrue Mion, PLLC

(57) ABSTRACT

Provided are apparatus, method, and device for automatically predict the impact when applying changes in a network. According to example embodiments, the apparatus may be configured to: receive a change request to be applied to a target network element in a network; obtain one or more previous change requests that have been applied to the target network element and information related to the target network element; generate a risk analysis report based on the method of procedure and the obtained one or more previous change requests and information using one or more machine learning models; and determine whether to apply the change request to the target network element based on the generated risk analysis report using the one or more machine learning models; wherein the risk analysis report may include data related to risks of applying the change request to the target network element on the network.

19 Claims, 8 Drawing Sheets

(56) References Cited

U.S. PATENT DOCUMENTS

| | | | | |
|---|---|---|---|---|
| 2024/0411542 | A1 * | 12/2024 | Goyal | G06F 8/433 |
| 2025/0139057 | A1 * | 5/2025 | Deutsch | G06F 3/0482 |
| 2025/0184955 | A1 * | 6/2025 | Adjei | H04W 64/003 |
| 2025/0337667 | A1 * | 10/2025 | Rady | H04L 43/065 |

* cited by examiner

IMPACT-DRIVEN MANAGEMENT OF CHANGE REQUESTS IN MOBILE NETWORK

FIELD

Apparatuses and methods consistent with example embodiments of the present disclosure relate to a telecommunication network, and more specifically, relate to Impact-Driven Management of Change Requests in Mobile Network.

BACKGROUND

A radio access network (RAN) is an important component in a telecommunications system, as it connects end-user devices (or user equipment) to other parts of the network. The RAN includes a combination of various network elements (NEs) that connect end-users to a core network. Traditionally, hardware and/or software of a particular RAN is vendor specific.

Open RAN (O-RAN) technology has emerged to enable multiple vendors to provide hardware and/or software to a telecommunications system. Since different vendors are involved, the type of hardware and/or software provided may also be different. That is, different types of NEs may be provided by different vendors, and depending on the specific service, the NE could be virtualized in software form (e.g., virtual machine (VM)-based), or could be in physical hardware form (e.g., non-VM based).

To this end, O-RAN disaggregates the RAN functions into a centralized unit (CU), a distributed unit (DU), and a radio unit (RU). The CU may be a logical node for hosting Radio Resource Control (RRC), Service Data Adaptation Protocol (SDAP), and/or Packet Data Convergence Protocol (PDCP) sublayers of the RAN. The DU may be a logical node hosting Radio Link Control (RLC), Media Access Control (MAC), and Physical (PHY) sublayers of the RAN. The RU may be a physical node that converts radio signals from antennas to digital signals that can be transmitted over the Front Haul to a DU. Because these entities have open protocols and interfaces between them, they can be developed by different vendors.

FIG. 1 illustrates an O-RAN architecture in the related art. RAN functions in the O-RAN architecture may be controlled and optimized by a RAN Intelligent Controller (RIC). The RIC may be a software-defined component that implements modular applications to facilitate the multivendor operability required in the O-RAN system, as well as to automate and optimize RAN operations. As shown in FIG. 1, the RIC may be divided into two types: a non-real-time RIC (Non-RT RIC) 120 and a near-real-time RIC (Near-RT RIC) 130.

The Non-RT RIC 120 may be the control point of a non-real-time control loop and may operate on a timescale greater than 1 second within a Service Management and Orchestration (SMO) framework 110. Its functionalities may be implemented through modular applications called rApps, and may include: providing policy based guidance and enrichment across the A1 interface, which is the interface that enables communication between the Non-RT RIC and the Near-RT RIC; performing data analytics; Artificial Intelligence/Machine Learning (AI/ML) training and inference for RAN optimization; and/or recommending configuration management actions over the O1 interface, which may be the interface that connects the SMO to RAN managed elements (e.g., Near-RT RIC 130, O-RAN Centralized Unit (O-CU) 140,150, O-RAN Distributed Unit (O-DU) 170, etc.).

The Near-RT RIC 130 may operate on a timescale between 10 milliseconds and 1 second and may be coupled with the O-DU 170, the O-CU (disaggregated into the O-CU control plane (O-CU-CP) 140 and the O-CU user plane (O-CU-UP) 150), and an open evolved NodeB (O-eNB) 160 via the E2 interface. The Near-RT RIC 130 may use the E2 interface to control the underlying RAN elements (E2 nodes/network functions (NFs)) over a near-real-time control loop. The Near-RT RIC 130 may monitor, suspend/stop, override, and control the E2 nodes (O-CU 140,150, O-DU 170, and O-eNB 160) via policies. For example, the Near-RT RIC 130 may set policy parameters on activated functions of the E2 nodes. Further, the Near-RT RIC 130 may host xApps to implement functions such as quality of service (QOS) optimization, mobility optimization, slicing optimization, interference mitigation, load balancing, security, etc.

Here, the O-CU-CP 140 and the O-CU-UP 150 may be coupled to each other via the E1 interface, and may be coupled to the O-DU 170 via the F1-c interface and F1-u interface, respectively. Further, the O-RU 180 may be coupled to the O-DU 170 via the Open Fronhaul (OF) Control (C), User (U), Synchronization(S), and Management (M) Planes, and may be coupled to the SMO 110 via the OF M-Plane.

The two types of RICs work together to optimize the O-RAN. For example, the Non-RT RIC 120 may provide the policies, data, and AI/ML models enforced and used by the Near-RT RIC 130 for RAN optimization, and the Near-RT RIC 130 may return policy feedback (i.e., how the policy set by the Non-RT RIC 120 works).

As mentioned above, the Non-RT RIC 120 may be located within the SMO framework 110, which manages and orchestrates RAN elements. Specifically, the SMO 110 may manage and orchestrate what is referred to as the O-Ran Cloud (O-Cloud) 190. The O-Cloud 190 may be a collection of physical RAN nodes that host the RICs, O-CUs, and O-DUs, the supporting software components (e.g., the operating systems and runtime environments), and the SMO 110 itself. In other words, the SMO 110 may manage the O-Cloud 190 from within. The O2 interface may be the interface between the SMO 110 and the O-Cloud 190 it resides in. Through the O2 interface, the SMO 110 may provide infrastructure management services (IMS) and deployment management services (DMS).

SUMMARY

Example embodiments of the present disclosure automatically predict the impact when applying changes in a network. As such, example embodiments of the present disclosure allows for automatic mapping between network elements in the network, which allows for identification and mitigation of potential risks when applying a change request to a target network element on the network, while taking into consideration comprehensive information to reduce time and risk of error for performing risk assessment.

According to example embodiments, an apparatus is provided. The apparatus may be configured to: receive a change request to be applied to a target network element in a network, wherein the change request may include at least a method of procedure specifying one or more changes to be applied to the target network; obtain one or more previous change requests that have been applied to the target network element and information related to the target network element; generate a risk analysis report based on the method of procedure and the obtained one or more previous change requests and information using one or more machine learning models; and determine whether to apply the change request to the target network element based on the generated risk analysis report using the one or more machine learning models; wherein the risk analysis report may include data related to risks of applying the change request to the target network element on the network.

According to example embodiments, a method is provided. The method may include: receiving a change request to be applied to a target network element in a network, wherein the change request may include at least a method of procedure specifying one or more changes to be applied to the target network; obtaining one or more previous change requests that have been applied to the target network element and information related to the target network element; generating a risk analysis report based on the method of procedure and the obtained one or more previous change requests and information using one or more machine learning models; and determining whether to apply the change request to the target network element based on the generated risk analysis report using the one or more machine learning models; wherein the risk analysis report may include data related to risks of applying the change request to the target network element on the network.

According to example embodiments, a non-transitory computer-readable recording medium is provided. The non-transitory computer-readable recording medium may have recorded thereon instructions executable by an apparatus to cause the apparatus to perform a method including: receiving a change request to be applied to a target network element in a network, wherein the change request may include at least a method of procedure specifying one or more changes to be applied to the target network; obtaining one or more previous change requests that have been applied to the target network element and information related to the target network element; generating a risk analysis report based on the method of procedure and the obtained one or more previous change requests and information using one or more machine learning models; and determining whether to apply the change request to the target network element based on the generated risk analysis report using the one or more machine learning models; wherein the risk analysis report may include data related to risks of applying the change request to the target network element on the network.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
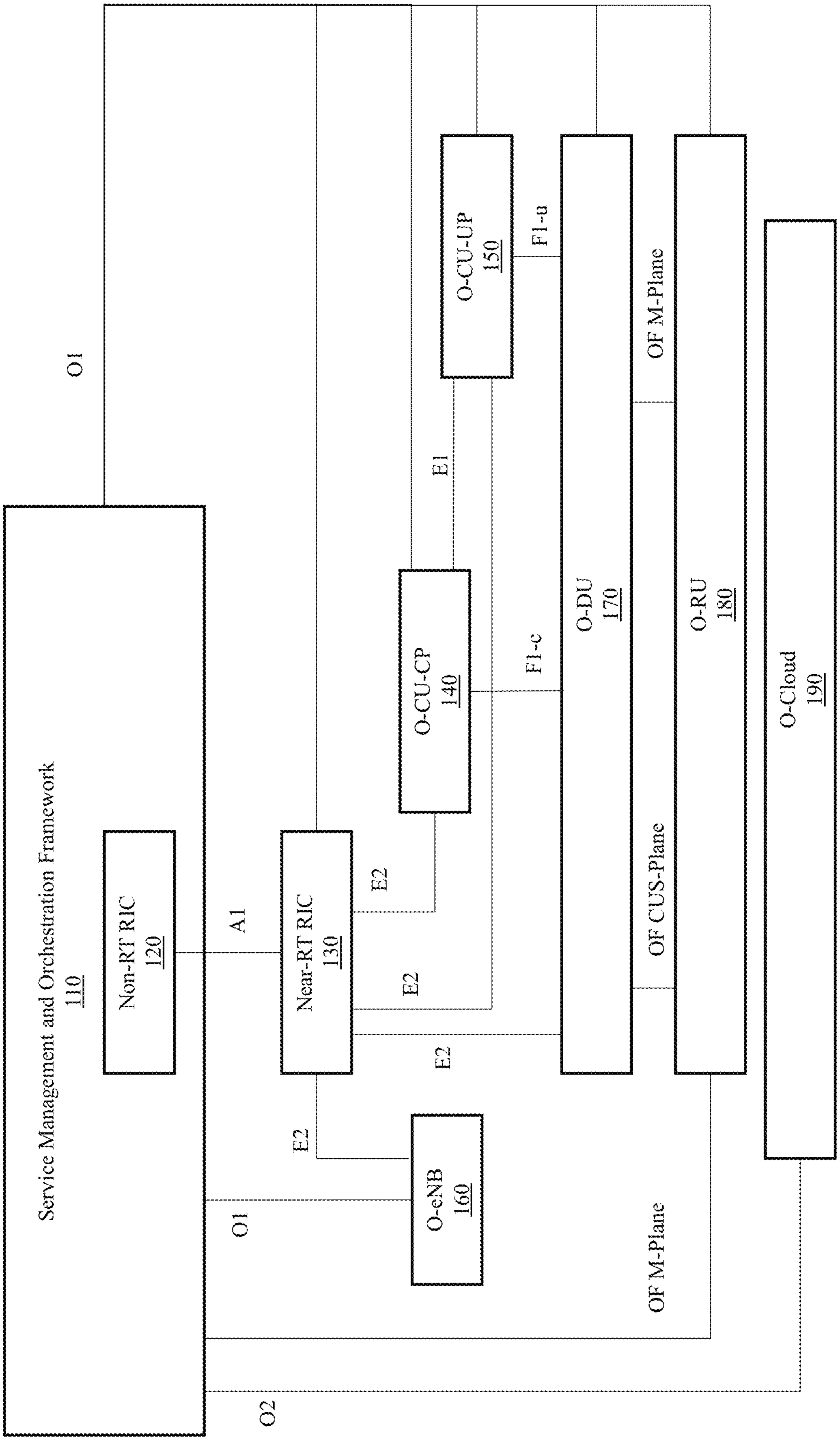
FIG. 1 (Related Art)
FIG. 1 illustrates an O-RAN architecture in the related art.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched, as long as these modifications may not affect the resulting scope of the invention.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "[A] and/or [B]", or "at least one of [A] or [B]" are to be understood as including only A, only B, or both A and B.

The foregoing disclosure provides illustration and description but is not intended to be exhaustive or to limit the implementations to the precise form disclosed. Modifications and variations are possible in light of the above disclosure or may be acquired from practice of the implementations.

It shall be noted that, descriptions of example embodiments of the present disclosure may include terms and names defined in one or more standard organizations, such as the 3rd Generation Partnership Project (3GPP) standard organization, the European Telecommunications Standards Institute (ETSI) standard organization, the Open RAN (O-RAN) Alliance, and the like. For instance, the terms [5GC, RRC, SR, etc.], and the like, as well as the associated features and operations, are to be interpreted as consistent with those specified in one or more [3GPP, O-RAN, etc.] specifications, unless being described otherwise.

As explained above in relation to FIG. 1, the O-RAN architecture may involve a large number of network elements that are connected and communicating with each other to perform various functions of the O-RAN.

In this regard, as more network elements are added into the network, it has become more difficult to map interactions between each of the network elements and determine how a change in one network element could have an effect on other network elements in the network.

In the related art, in order to determine how a change in one network element could have an effect on other network elements in the network, an operator may need to manually review information related to the change, such as manuals, inventory, and records associated with the network element that is receiving the change and then make determinations based on such information.

However, the above approach in the related art may have the following shortcomings. Having a human operator manually review complex information associated with the network element that is receiving the change may be time consuming and error prone. Further, information reviewed and considered by the operator may not be fully comprehensive and may not be up to date with the most recent configuration of the network and the latest network elements that have been added to the network.

For example, from the O-RAN and cloud native network perspective, network elements may not be dedicated inside a specific hardware, and thus one hardware can host multiple microservices in which each one of them can represent a specific role. In this regard, trying to map connectivity between each of the network elements using the known legacy network way (manual inventory management) in order to understand the effect of a specific change in the core side and how such change is going to be reflected on the end user's experience may no longer viable and may be prone to causing error. This may be worsened by the fact that some microservices have the ability to continuously scale up/down and change their own local IP automatically during normal operations.

Further, understanding the expected effect of a specific change may be entirely dependent on the lap tests and recommendations from vendors, without any consideration for identifying hidden software bugs and localizing the problems in different scenarios.

Accordingly, system, methods, devices, and the like, provided in the example embodiments of the present disclosure automatically manage impact when applying changes in a network.

According to example embodiments, in order to manage impact when applying changes in a network, the system may generate a risk analysis report based on a method of procedure included in a change request and previous change requests using one or more machine learning models, where the risk analysis report may include data related to risks of applying the change request to the target network element on the network.

Ultimately, example embodiments of the present disclosure automatically manage impact when applying changes in a network, which allows for automatic mapping between network elements in the network, and allows for identification and mitigation of potential risks when applying a change request to a target network element on the network, while taking into consideration comprehensive information to reduce time and risk of error for performing risk assessment.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the threshold tuning system of the present disclosure, according to one or more embodiments, are provided in the following.

Example System Architecture

Figure 2:
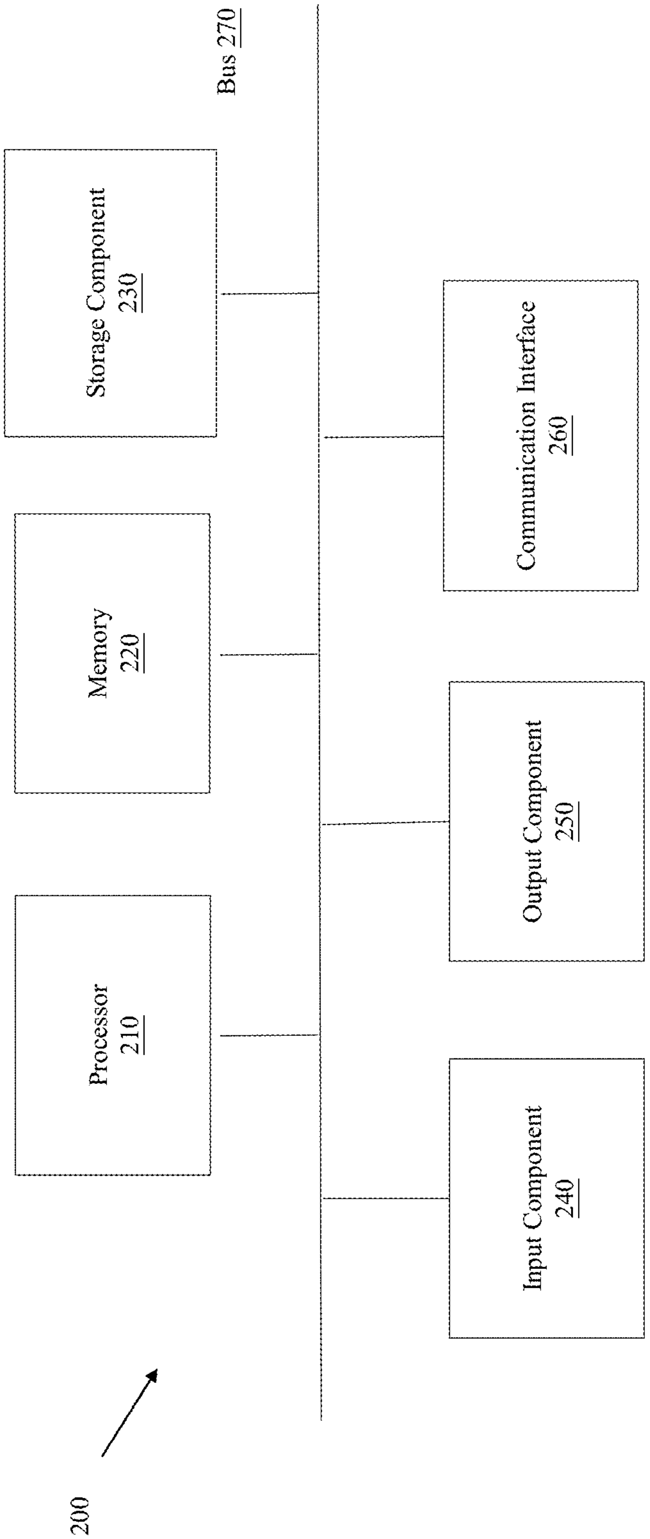
FIG. 2 illustrates an exemplary embodiment of an Impact Management system, according to one or more embodiments.

FIG. 2 illustrates an exemplary embodiment of an Impact Management system 200, according to one or more embodiments. As shown in FIG. 2, the Impact Management system 200 may include a processor 210, a memory 220, a storage component 230, an input component 240, an output component 250, a communication interface 260, and a bus 270.

The Impact Management system 320 may correspond to an apparatus, a system, a platform, a module, or the like, which may be configured to perform one or more operations or actions for impact management in a network.

The processor 210, as used herein, means any type of computational circuit that may comprise hardware elements and software elements. The processor 210 may be embodied as a multi-core processor, a single core processor, or a combination of one or more multi-core processors and one or more single core processors, a distributed processing system, or the like. The processor 210 may be a Central Processing Unit (CPU) a graphics processing unit (GPU), an accelerated processing unit (APU), an application-specific integrated circuit (ASIC), or another type of processing component.

Memory 220 may include a random-access memory (RAM), a read only memory (ROM), and/or another type of dynamic or static storage device (e.g., a flash memory, a magnetic memory, and/or an optical memory) that stores information and/or instructions for use by processor 210. The memory 220 may include machine-readable instructions which are executable by the processor 210. These machine-readable instructions when executed by the processor 210 causes the processor 210 to perform method steps of an exemplary embodiment described herein.

Storage component 230 may store information and/or software related to the operation and use of the Impact Management system 200. For example, storage component 230 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 240 may be configured to receive information, such as via user input. For example, the input component 240 may include, but not be limited to, a touch screen display, a keyboard, a keypad, a mouse, a button, a switch, and/or a microphone. Additionally, or alternatively, the input component 240 may include a sensor for sensing information (e.g., a global positioning system (GPS), an accelerometer, a gyroscope, and/or an actuator).

Output component 250 may be configured to provide output information from the Impact Management system 200. For example, the output component 250 may be, but not limited to, a display, a speaker, and/or one or more light-emitting diodes (LEDs).

Communication interface 260 may be an interface that provides a communication connection to other devices. The connection by the communication interface 260 may be a wired connection, a wireless connection, or a combination of wired and wireless connections, and may be a direct connection or an indirect connection via a communication network that exists between other devices. In other words, the standard of the communication interface 260 is not limited.

The bus 270 may act as an interconnect between the processor 210, the memory 220, the storage component 230, the input component 240, the output component 250, and the communication interface 260 of the Impact Management system 200.

The number and arrangement of components shown in FIG. 2 are provided as an example. In practice, Impact Management system 200 may include additional components, fewer components, different components, or differently arranged components than those shown in FIG. 2. Additionally, or alternatively, a set of components (e.g., one or more components) of Impact Management system 200 may perform one or more functions described as being performed by another set of components of Impact Management system 200.

Descriptions of several example operations which may be performed by the processor 210 are provided below with reference to FIG. 4 to FIG. 6.

Figure 3A:
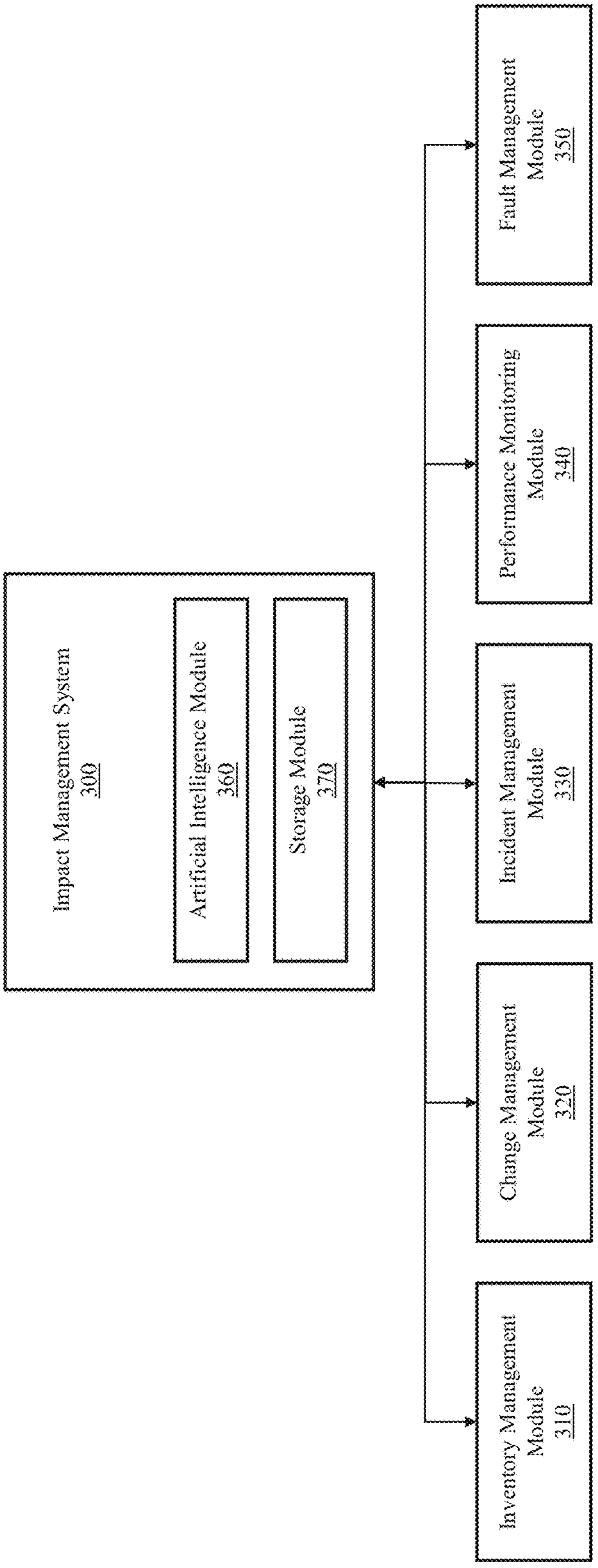
FIG. 3A illustrates a block diagram of example components in an Impact Management system, according to one or more embodiments.

FIG. 3A illustrates a block diagram of example components in an Impact Management (IM) system 300, according to one or more embodiments. The Impact Management system 300 may correspond to the Impact Management system 200 in FIG. 2, thus the features associated with the Impact Management system 200 and the Impact Management system 300 may be similarly applicable to each other, unless being explicitly described otherwise.

As illustrated in FIG. 3A, the Impact Management system 300 may be communicatively coupled to at least one inventory management module 310, at least one change management module 320, at least one incident management module 330, at least one performance monitoring module 340, and at least one fault management module 350, and may include at least one artificial intelligence module 360 and at least one storage module 370, although it can be understood that the Impact Management system 300 may be communicatively coupled to and include more or less components than as illustrated in FIG. 3A, and/or may be arranged in a manner different from as illustrated in FIG. 3A, without departing from the scope of the present disclosure.

Here, it may be understood that the Impact Management system 300 may be communicatively coupled to the O-RAN architecture to manage impact related to network elements within the O-RAN architecture. The network elements may include network elements within the O-RAN architecture.

The inventory management module 310 may be communicatively coupled to the Impact Management system 300 and may be configured to manage processes related to storage and retrieval of data related to hardware and software of the network elements.

The change management module 320 may be communicatively coupled to the Impact Management system 300 and may be configured to manage processes related to applications (implementations) of changes to network elements within a network. According to example embodiments, the change management module 320 may be configured to generate a risk analysis report to determine potential risks associated with an application of a Change Request (CR) to a network element, determine whether to apply the CR to the network element based on such risk analysis report, and then apply the CR to the network element. According to example embodiments, the change management module 320 may be configured to generate an impact analysis report to determine impacts associated with an application of a CR to a network element, determine whether to roll back the CR based on such impact analysis report, and then roll back the CR to the network element. According to example embodiments, the Impact Management Module 300 may be configured to communicate with the change management module 320 in order to generate the risk analysis report, generate the impact analysis report, and the like.

Here it may be understood that a change request (CR) may include a proposal (request) to apply one or more changes to a network element within the network. For example, the CR may include a request for additions, deletions, and/or modifications to existing telecommunications systems, services, and/or infrastructure. Further, the CR may include all relevant data related to the one or more changes, such as documentation, diagrams, scripts, and any other relevant materials needed to carry out the requested changes effectively and efficiently. For example, the CR may include a method of procedure (MOP), which is a document outlining a detailed steps/instructions required to perform a specific task or operation in order to apply the one or more changes. In another example, the CR may also include details such as description of the requested change, rationale or business case behind the change, impact analysis (including potential risks and benefits), timeline for implementation, and any associated costs The incident management module 330 may be communicatively coupled to the Impact Management system 300 and may be configured to manage processes related to responses to incidents occurring within a network. According to example embodiments, the incident management module 330 may be configured to obtain information related to an incident, obtain current and previous CRs, generate a correlation report to determine correlations between current and previous CRs and the incident, determine whether the indecent is correlated to the current or previous CRs, and then trigger an incident management process or transmit the correlation report. It may be understood that the incident management process may be performed in the manner as known in the related art. According to example embodiments, the incident management module 330 may be learned, in order to process the history of incidents and its correlation with CRs and issues, such as software version mismatches. According to example embodiments, the Impact Management Module 300 may be configured to communicate with the incident management module 330 in order to obtain information related to an incident, obtain current and previous CRs, and the like.

The performance monitoring module 340 may be communicatively coupled to the Impact Management system 300 and may be configured to track and monitor various performance metrics within the Impact Management system 300 and the network, such as response times, throughput, resource utilization, and the like. According to example embodiments, the Impact Management Module 300 may be configured to communicate with the performance monitoring module 340 in order to track and monitor the various performance metrics and the like.

The fault management module 350 may be communicatively coupled to the Impact Management system 300 and may be configured to track and monitor for errors, failures, abnormal behaviors, and the like that may occur within the Impact Management system 300 and the network, in order to detect faults and incidents occurring with the Impact Management system 300 and the network. According to example embodiments, the Impact Management Module 300 may be configured to communicate with the fault management module 350 in order to track and monitor for the errors, failures, abnormal behaviors, and the like.

The artificial intelligence module 360 may be configured to utilize artificial intelligence/machine learning algorithms to perform various analyses and determinations for the modules of the Impact Management system 300. According to example embodiments, the artificial intelligence module 360 may be utilized by the change management module 320 to manage processes related to applications (implementations) of changes to network elements within a network, such as generating the risk analysis report, determining whether to apply the CR to the network element, and the like. According to example embodiments, the artificial intelligence module 360 may be utilized by the incident management module 330 to manage processes related to responses to incidents occurring within a network, such as generating the correlation report, determining whether the indecent is correlated to the current or previous CRs, and the like.

According to example embodiments, the artificial intelligence module 360 may include one or more machine learning models. According to example embodiments, the one or more machine learning models may include one or more of an aggregate model, a neighbor-based predictor, and time-to-event predictor.

Figure 3B:
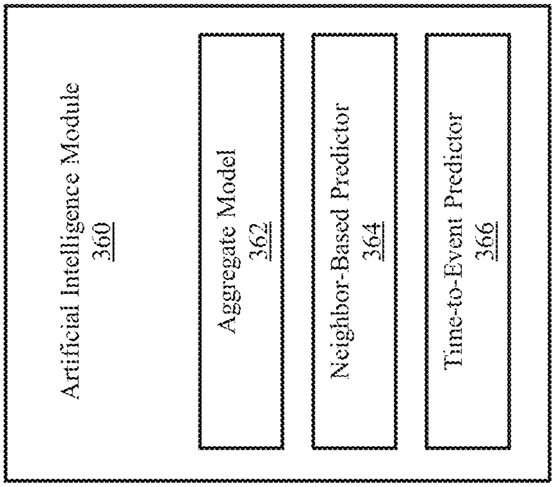
FIG. 3B illustrates a block diagram of example components in an artificial intelligence module, according to one or more embodiments.

FIG. 3B illustrates a block diagram of example components in an artificial intelligence module 360, according to one or more embodiments. The artificial intelligence module 360 in FIG. 3B may correspond to the artificial intelligence module 360 in FIG. 3A.

As illustrated in FIG. 3B, the artificial intelligence module 360 may include at least one aggregate model 362, at least one neighbor-based predictor 364, and at least one time-to-event predictor 366, although it can be understood that the artificial intelligence module 360 may include more or less components than as illustrated in FIG. 3B, and/or may be arranged in a manner different from as illustrated in FIG. 3B, without departing from the scope of the present disclosure.

According to example embodiments, the aggregate model 362 may include a combination of machine learning models, such as Random Forests of decision trees. Each of the machine learning models may be trained based on a different subset of data (e.g., care taker domain, network element name, network element type, network element software version, direct/indirect nodes connected, and the like), and may be merged via ensemble learning algorithm to perform a more accurate analysis of historical data and related features (e.g., upgrades timelines, node behavior information while upgrades including performance issues, detailed impact of activity on main nodes and other connected nodes in the tree, and the like) while ensuring stable predictions of future incidents (e.g., incompatible software version, utilization problems, performance problems, and the like).

According to example embodiments, the neighbor-based predictor 364 may include instance-based machine learning models, such as K-Nearest Neighbors (KNN). The neighbor-based predictor 364 may predict potential network issues (e.g., unstable node with flapping/un-cleared critical alarms, and the like) based on the historical behavior of neighboring network elements (e.g., response delays, connecting to performance monitoring module 340 to read performance degradation triggers, connecting to fault management module 350 to read alarms status and expected impact of the alarm, and the like).

According to example embodiments, the time-to-event predictor 366 may include survival analysis machine learning models, such as Accelerated Failure Time (AFT) model. The time-to-event predictor 366 may predict the remaining lifespan of network equipment or infrastructure components.

According to example embodiments, outputs of the one or more machine learning models may be integrated using any method as appropriate. For example, the one or more machine learning models may be integrated together via feature fusion, where features, insights, and information generated by each of the one or more machine learning models (i.e., each of the aggregate model 362, neighbor-based predictor 364, and time-to-event predictor 366) are combined and merged to create a richer set of features capturing different aspects of the data.

In view of the above, since each of the one or more machine learning models have different strengths (e.g., the aggregate model is good with handling complex relationships, the neighbor-based predictor is good with handling proximity-based classification, and the time-to-event predictor is good with handling time-to-event data), utilizing a combination of the one or more machine learning models helps mitigate individual model biases and errors. Accordingly, the Impact Management system 300 may obtain more accurate and reliable insights, as well as being adaptable to changes in the network element thereby ensuring continued relevance and effectiveness.

According to example embodiments, the artificial intelligence module 360 may process previous CRs and related information as learned information. Further, the artificial intelligence module 360 may process data from one or more of the inventory management module 310, the change management module 320, the incident management module 330, the performance monitoring module 340, and the fault management module 350 in real time.

The storage module 370 may be configured to store data related to changes of network elements within the network, such as CRs. According to example embodiments, the storage module may include a data lake, which may be a centralized repository configured to store, process, and secure large amounts of structured, semi-structured, and unstructured data as known in the art. According to example embodiments, the storage module 370 may be configured to store all CRs that have been previously applied (implemented) to the network elements within the network.

Figure 4:
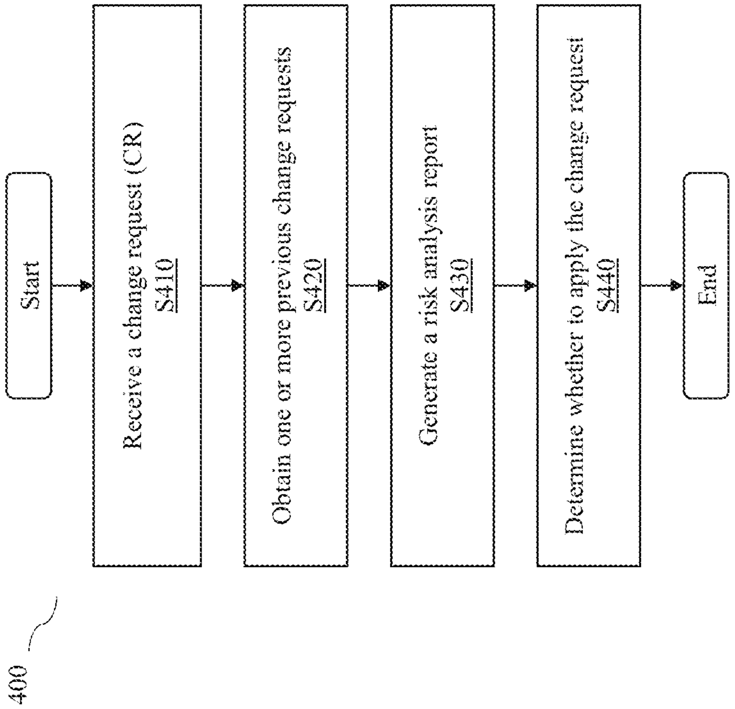
FIG. 4 illustrates a flow diagram of an example method for impact management, according to one or more embodiments.
Figure 5:
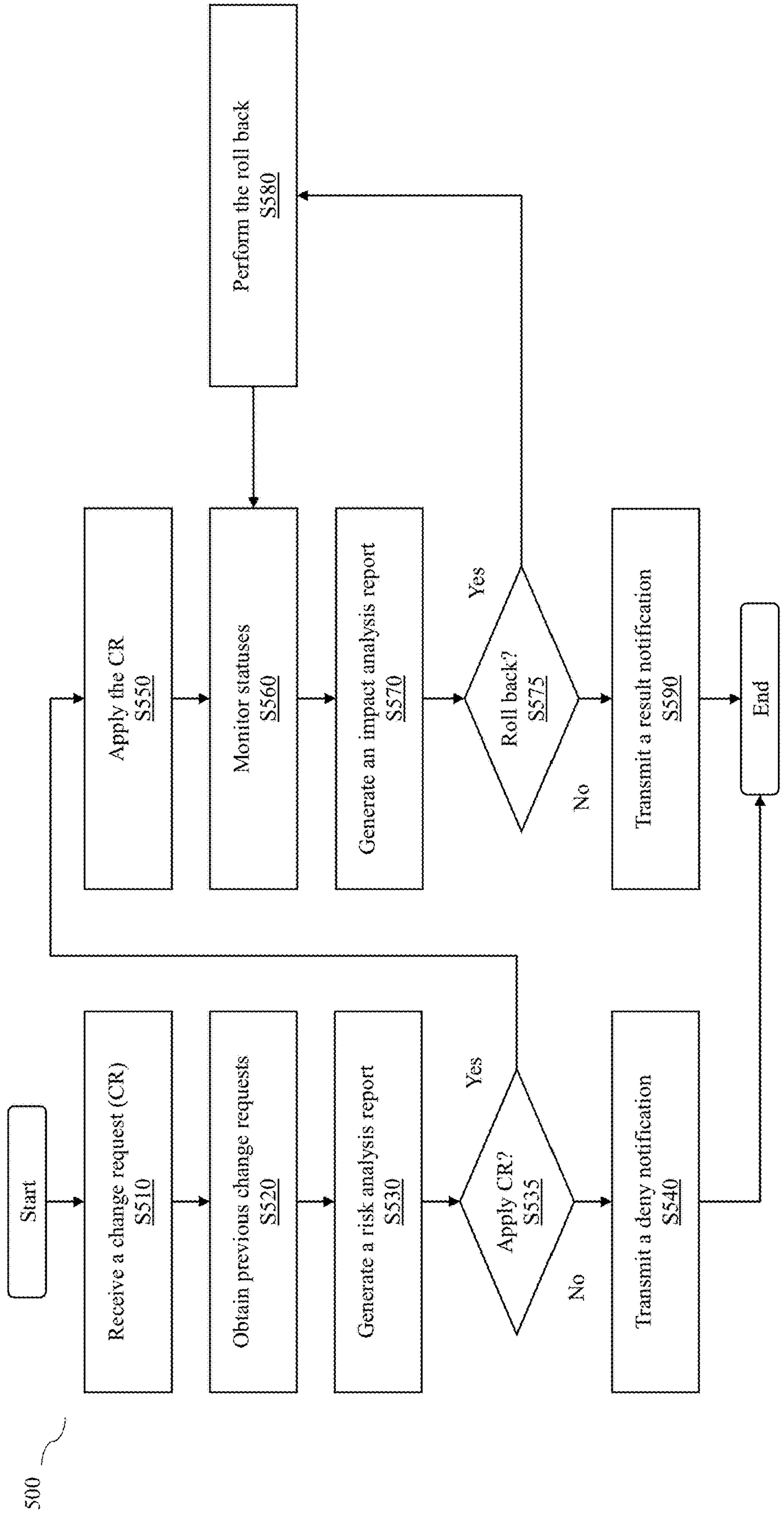
FIG. 5 illustrates a flow diagram of an example method for impact management, according to one or more embodiments.
Figure 6:
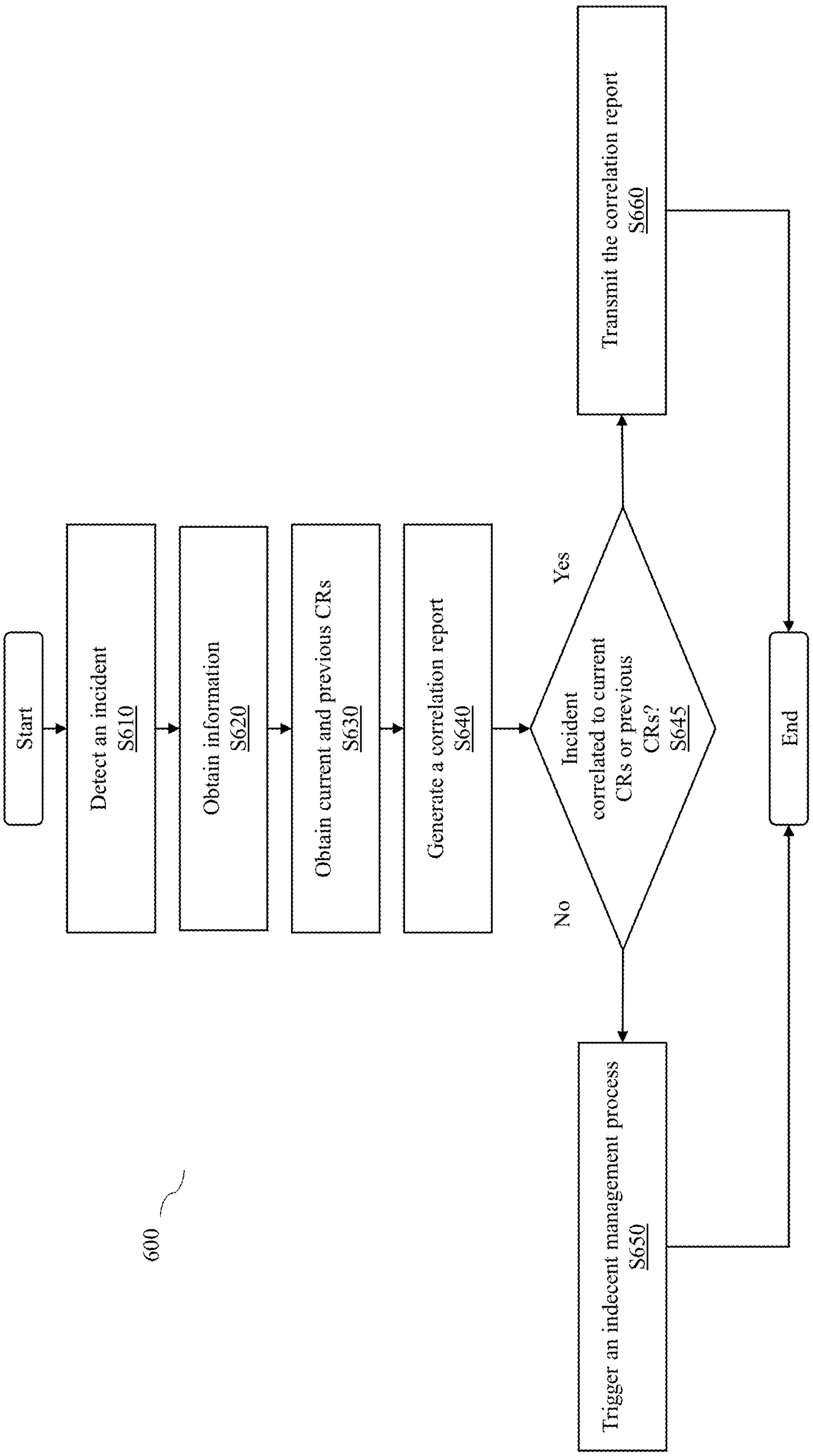
FIG. 6 illustrates a flow diagram of an example method for impact management, according to one or more embodiments.

In embodiments, any one of the operations or processes of FIG. 4 to FIG. 6 may be implemented by or using any one of the elements illustrated in FIG. 2 and FIG. 3. It is understood that other embodiments are not limited thereto, and may be implemented in a variety of different architectures (e.g., bare metal architecture, any cloud-based architecture or deployment architecture such as Kubernetes, Docker, OpenStack, etc.).

Example Operations for Managing Impact in the Present Disclosure

In the following, several example operations performable by the Impact Management system of the present disclosure are described with reference to FIG. 4 to FIG. 6.

FIG. 4 illustrates a flow diagram of an example method 400 for impact management, according to one or more embodiments. One or more operations in method 400 may be performed by at least one processor (e.g., processor 210) of the Impact Management system.

As illustrated in FIG. 4, at operation S410, the at least one processor may be configured to receive a change request (CR) to be applied to a target network element in a network. According to example embodiments, the change request may include at least a method of procedure (MOP) specifying one or more changes to be applied to the target network. According to example embodiments, the change request may be received from a user. According to example embodiments, the target network element may be one of a plurality of network elements in the network, where the network elements may include network elements within the O-RAN architecture. The method then proceeds to operation S420.

At operation S420, the at least one processor may be configured to obtain one or more previous change requests that have been applied to the target network element and information related to the target network element. In particular, the target network element may have had a plurality of change requests applied previously, and such previous change requests may be stored. Accordingly, the at least one processor may be configured to obtain such previous change requests for the target network element. Further, the information related to the target network element may be information obtained from one or more of the inventory management module 310, the change management module 320, the incident management module 330, the performance monitoring module 340, the fault management module 350, the artificial intelligence module 360, and the storage module 370. For example, the information related to the target network element may include information regarding performance metrics of the target network element that is monitored by the performance monitoring module. In another example, the information related to the target network element may include learned information obtained from the artificial intelligence module. The method then proceeds to operation S430.

At operation S430, the at least one processor may be configured to generate a risk analysis report based on the method of procedure (i.e., the method of procedure in the change request that was received during operation S410) and the obtained one or more previous change requests and information (i.e., the one or more previous change requests and information obtained during operation S420).

According to example embodiments, the risk analysis report may include data related to potential risks of applying the change request to the target network element on the network. According to example embodiments, the risk analysis report includes one or more of: a list of network elements in the network that are expected to be impacted by the application of the change request to the target network element; one or more change requests to be applied to other network elements in the network that are expected to conflict with the change request to be applied to the target network element; one or more activities that are expected to conflict with the change request to be applied to the target network element; one or more issues that are expected to occur with the change request to be applied to the target network element; network elements survival analysis; and one or more suggestions on an implementation timing of the change request.

In particular, the list of network elements in the network that are expected to be impacted by the application of the change request to the target network element may refer to network elements that are expected to be directly or indirectly impacted once the change request is applied to the target network element. According to example embodiments, the risk analysis report may also specify details of the potential impact, such as the type of impact, duration of impact, and the like. It may be understood that impact may refer to any kind of impact, such as a change in performance, an occurrence of error, and the like. For example, once the change request is applied to the target network element, a second network element that is communicating with the target network element may be expected to no longer be able to communicate with the target network element (e.g., the change request may cause potential software/hardware version compatibility issues and prevent the second network element from properly communicating with the target network element). Accordingly, the risk analysis report may specify such second network element.

The one or more change requests to be applied to other network elements in the network that are expected to conflict with the change request to be applied to the target network element may refer to change requests that are to be applied to other network elements and that are expected to be in conflict with the change request to be applied to the target network element. For example, change request to be applied to the target network element may require the target network element to communicate with a third network element, however, the third network element may have a change request to be applied that would render the third network element unable to communicate with the target network element. Accordingly, the risk analysis report may specify such third network element (i.e., the impacted network element) and the associated change request.

The one or more activities that are expected to conflict with the change request to be applied to the target network element may include one or more of other change requests, parameter change requests, timer change requests, software update requests, patch update requests, soft reset requests, hard reset requests, hardware change/replacement requests, cable change/replacement requests. It may be understood that the "change" above denotes any action involving modification to the network.

The one or more issues that are expected to occur with the change request to be applied to the target network element may refer to issues that are expected to occur to the target network element or other network elements within the network once the change request is applied to the target network element. For example, the change request may include a bug that may affect the performance of the target network element and put the planned change at risk. Accordingly, the risk analysis report may specify such bug.

The network elements survival analysis may refer to an analysis regarding a remaining lifespan of network equipment and/or infrastructure components associated with the target network element once the change request is applied to the target network element.

The one or more suggestions on an implementation timing of the change request may refer to one or more suggestions for suitable and optimal timing (date and time) to implement (apply) the change request to the target network element. The implementation timing may be provided according to the one or more machine learning models understanding of effects of the change request, method of procedure, and other activities from other domains which might affect the same network element.

According to example embodiments, the risk analysis report may be generated based on the method of procedure and the obtained one or more previous change requests and information using one or more machine learning models (i.e., one or more machine learning models in the artificial intelligence module). In particular, the one or more machine learning models may analyze data included in the method of procedure and in the obtained one or more previous change requests and information, in order to identify potential risks of applying the change request to the target network element on the network (e.g., identify network elements that are expected to be impacted by the application of the change request to the target network element, change requests to be applied to other network elements that are expected to conflict with the change request to be applied to the target network element, and the like).

It may be understood that the one or more machine learning models may obtain and analyze any additional data in order to generate the risk analysis report as required. For example, the one or more machine learning models may further analyze data based on one or more of connections between each network elements in the network (network connectivity and nodes tree), history of incidents/issues that have occurred in the network in the past, current performance and statuses of each network elements in the network (i.e., via the performance monitoring module and the fault management module), configuration information of each network elements in the network such as software versions, current and previous change requests, and the like.

Accordingly, the above process allows for automatic mapping between network elements in the network, which allows for identification and mitigation of potential risks of applying the change request to the target network element on the network, including identification of expected impacted network elements regardless of how far away such impacted network elements are relative to the target network element (i.e., it possible to map RAN sites/RAN element to a single change in aggregation routers or similar elements in core network).

Further, since the above process is performed using machine learning models, complex information can be fully and comprehensively considered while reducing time and risk of error for performing risk assessment which also reduces impact on customer's experience. Furthermore, since previous change requests are considered when generating the risk analysis report, the above process also allows for identification of issues that have occurred in the past and prevent such issues from occurring again. The method then proceeds to operation S440.

At operation S440, the at least one processor may be configured to determine whether to apply the change request to the target network element based on the generated risk analysis report. According to example embodiments, the at least one processor may be configured to determine whether to apply the change request to the target network element based on the generated risk analysis report using the one or more machine learning models.

According to example embodiments, the at least one processor may be configured to determine whether to apply the change request to the target network element based on whether a severity of potential risks of applying the change request to the target network element on the network indicated in the generated risk analysis report is too high. According to example embodiments, the degree of severity used for the determination may be preconfigured by a user or learned by supervised or unsupervised AI/ML algorithms. For example, the user may preconfigure the severity such that as long as there is at least one potential risk (e.g., there is at least one change request to be applied to other network elements in the network that is expected to conflict with the change request to be applied to the target network element), the change request should not be applied.

Accordingly, based on determining that the severity is too high, the at least one processor may determine that the change request should not be applied to the target network element. On the other hand, based on determining that the severity is not too high, the at least one processor may determine that the change request should be applied to the target network element.

Accordingly, the above process allows for the system to automatically analyze potential risks of applying the change request to the target network element on the network, and then accordingly determine whether or not to proceed to apply the change request. Further, since the potential risks are determined and analyzed using machine learning models based on comprehensive data, reliable and accurate prediction can be achieved.

Upon performing operation S440, the method 400 may be ended or be terminated. Alternatively, method 400 may return to operation S410, such that the at least one processor may be configured to repeatedly perform, for at least a predetermined amount of time, the receiving the change request (at operation S410), the obtaining the one or more previous change requests and information related to the target network element (at operation S420), the generating the risk analysis report (at operation S430), and the determining whether to apply the change request (at operation S440). For instance, the at least one processor may continuously (or periodically) receive more change request for the same target network element or a different network element, and then restart the receiving the change request (at operation S410), the obtaining the one or more previous change requests and information related to the target network element (at operation S420), the generating the risk analysis report (at operation S430), and the determining whether to apply the change request (at operation S440).

To this end, the system of the present disclosure may manage impact of applying the change request to the target network element on the network.

FIG. 5 illustrates a flow diagram of an example method 500 for impact management, according to one or more embodiments. One or more operations in method 500 may be performed by at least one processor (e.g., processor 210) of the Impact Management system.

As illustrated in FIG. 5, at operation S510, the at least one processor may be configured to receive a change request (CR) to be applied to a target network element in a network, in a similar manner as operation S410 in method 400. The method then proceeds to operation S520.

At operation S520, the at least one processor may be configured to obtain one or more previous change requests that have been applied to the target network element and information related to the target network element, in a similar manner as operation S420 in method 400. The method then proceeds to operation S530.

At operation S530, the at least one processor may be configured to generate a risk analysis report based on the method of procedure and the obtained one or more previous change requests and information, in a similar manner as operation S430 in method 400. The method then proceeds to operation S535.

At operation S535, the at least one processor may be configured to determine whether to apply the change request to the target network element based on the generated risk analysis report, in a similar manner as operation S440 in method 400.

According to example embodiments, the at least one processor may be configured to determine whether to apply the change request to the target network element based on whether a severity of potential risks of applying the change request to the target network element on the network indicated in the generated risk analysis report is too high. According to example embodiments, the degree of severity used for the determination may be preconfigured by a user or learned by supervised or unsupervised AI/ML algorithms. For example, the user may preconfigure the severity such that as long as there is at least one potential risk (e.g., there is at least one change request to be applied to other network elements in the network that is expected to conflict with the change request to be applied to the target network element), the change request should not be applied.

Accordingly, based on determining that the severity is too high, the at least one processor may determine that the change request should not be applied to the target network element, and the method proceeds to operation S540. On the other hand, based on determining that the severity is not too high, the at least one processor may determine that the change request should be applied to the target network element, and the method proceeds to operation S550.

Accordingly, the above process allows for the system to automatically analyze potential risks of applying the change request to the target network element on the network, and then accordingly determine whether or not to proceed to apply the change request. Further, since the potential risks are determined and analyzed using machine learning models based on comprehensive data, reliable and accurate prediction can be achieved.

At operation S540, the at least one processor may be configured to transmit a deny notification. The deny notification may be transmitted to the user, and may include information regarding the determination to not apply the change request to the target network element. According to example embodiments, the deny notification may include the risk analysis report. Accordingly, the user may review the deny notification and revise the change request such that the potential risks are minimized.

At operation S550, the at least one processor may be configured to apply the change request to the target network element. According to example embodiments, the change request may be applied by performing the steps/instructions specified in the method of procedure included in the change request. According to example embodiments, the change request may be applied at a time suggested in the risk analysis report. The method then proceeds to operation S560.

At operation S560, the at least one processor may be configured to monitor statuses of the target network element as well as other network elements in the network. According to example embodiments, the at least one processor may be configured to monitor statuses of the target network element as well as other network elements for a period of time, where the period of time may be preconfigured by the user or learned by supervised or unsupervised AI/ML algorithms. The method then proceeds to operation S570.

At operation S570, the at least one processor may be configured to generate an impact analysis report based on the monitored statuses. According to example embodiments, the at least one processor may be configured to generate the impact analysis report based on the monitored statuses using the one or more machine learning models. According to example embodiments, the impact analysis report may include data related to impacts (i.e., actual/measured impacts, rather than expected/predicted impact) of applying the change request to the target network element on the target network element and other network elements in the network. According to example embodiments, the impact analysis report may include one or more of: statuses of each network elements in the network (network element health status), and a list of network elements in the network that are impacted by the application of the change request to the target network element as well as details of the impact, such as the type of impact, duration of impact, and the like.

Accordingly, the above process allows for identification of actual impacts of applying the change request to the target network element on the network, including identification of impacted network elements regardless of how far away such impacted network elements are relative to the target network element (i.e., it possible to map RAN sites/RAN element to a single change in aggregation routers or similar elements in core network). As such, the above process saves time for manual check.

Further, since the above process is performed using machine learning models, complex information can be fully and comprehensively considered while reducing time and risk of error for identifying the impact which also reduces impact on customer's experience. The method then proceeds to operation S575.

At operation S575, the at least one processor may be configured to determine whether a roll back should be performed on the target network element based on the generated impact analysis report. According to example embodiments, the at least one processor may be configured to determine whether a roll back should be performed on the target network element based on the generated impact analysis report using the one or more machine learning models.

According to example embodiments, the at least one processor may be configured to determine whether the roll back should be performed based on whether a severity of the impacts of applying the change request to the target network element on the network indicated in the generated impact analysis report is too high. According to example embodiments, the degree of the severity used for the determination may be preconfigured by a user or learned by supervised or unsupervised AI/ML algorithms.

Accordingly, based on determining that the severity is too high, the at least one processor may determine that the roll back should be performed on the target network element, and the method proceeds to operation S580. On the other hand, based on determining that the severity is not too high, the at least one processor may determine that the roll back should not be performed on the target network element, and the method proceeds to operation S590

Accordingly, the above process allows for the system to automatically analyze impacts of applying the change request to the target network element on the network, and then accordingly determine whether or not to roll back the change request. As such, the above process saves time for manual intervention and reduces time of the impact on customer's experience. Further, since the impacts are identified and analyzed using machine learning models based on comprehensive data, reliable and accurate identification results can be achieved.

At operation S580, the at least one processor may be configured to perform the roll back on the target network element. According to example embodiments, the roll back may be performed by reverting and undoing all changes that have been done according to the change request. The method then returns to operation S560 to monitor statuses of the network elements in the network in order to ensure that the target network element returns to its previous configuration and the impacts of applying the change request to the target network element on the network are resolved.

At operation S590, the at least one processor may be configured to transmit a result notification. The result notification may be transmitted to the user, and may include information regarding the result of applying the change request to the target network element. For example, the result notification may notify the user that the change request has been successfully applied to the target network element. In another example, the result notification may notify the user that the change request has not been successfully applied to the target network element, and that the roll back was performed. According to example embodiments, the result notification may include the impact analysis report. According to example embodiments, the result notification may also include the risk analysis report. Accordingly, the user may review the result notification and revise the change request such that the impacts are minimized if necessary.

Upon performing operation S540 or S590, the method 500 may be ended or be terminated. Alternatively, method 500 may return to operation S510, such that the at least one processor may be configured to repeatedly perform, for at least a predetermined amount of time, the receiving the change request (at operation S510), the obtaining the one or more previous change requests and information related to the target network element (at operation S520), the generating the risk analysis report (at operation S530), the determining whether to apply the change request (at operation S535), the transmitting the deny notification (at operation S540), the applying the change request (at operation S550), the monitoring the statuses (at operation S560), the generating the impact analysis report (at operation S570), the determining whether the roll back should be performed (at operation S575), the performing the roll back (at operation S580), and the transmitting the result notification (at operation S590).

For instance, the at least one processor may continuously (or periodically) receive more change request for the same target network element or a different network element, and then restart the receiving the change request (at operation S510), the obtaining the one or more previous change requests and information related to the target network element (at operation S520), the generating the risk analysis report (at operation S530), the determining whether to apply the change request (at operation S535), the transmitting the deny notification (at operation S540), the applying the change request (at operation S550), the monitoring the statuses (at operation S560), the generating the impact analysis report (at operation S570), the determining whether the roll back should be performed (at operation S575), the performing the roll back (at operation S580), and the transmitting the result notification (at operation S590).

To this end, the system of the present disclosure may manage impact of applying the change request to the target network element on the network, and revert any changes as necessary.

FIG. 6 illustrates a flow diagram of an example method 600 for impact management, according to one or more embodiments. One or more operations in method 600 may be performed by at least one processor (e.g., processor 210) of the Impact Management system. According to example embodiments, method 600 may be performed after method 500.

As illustrated in FIG. 6, at operation S610, the at least one processor may be configured to detect an incident occurring within a network. The incident may include any kind of incident that occurs with any network element in the network. For example, the at least one processor may be configured to detect an error occurring with a communication between two network elements in the network. The method then proceeds to operation S620.

At operation S620, the at least one processor may be configured to obtain information related to the detected incident. According to example embodiments, the information related to the detected incident may include at least one or more network elements in the network associated with the incident and the type of incident. For example, the at least one processor may be configured to identify the above two network elements and identify that the incident is related to communication error. According to example embodiments, the at least one processor may also be configured to perform a trouble ticket creation process. The method then proceeds to operation S630.

At operation S630, the at least one processor may be configured to obtain current change requests being applied in the network and previous change requests that have been applied in the network. The current change requests being applied in the network may include all current change requests that are being applied to the network elements in the network. The previous change requests that have been applied in the network may include all change requests that have been applied to the network elements in the network. The method then proceeds to operation S640

At operation S640, the at least one processor may be configured to generate a correlation report. The correlation report may be generated based on at least the obtained information, the obtained current change requests, and the obtained previous change requests, and may identify any correlations between the detected incident and the current change requests, and any correlations between the detected incident and the previous change requests. According to example embodiments, the correlation report may be generated using one or more machine learning models.

Accordingly, the above process allows for identification of correlations between the detected incident and the current change requests that are being applied in the network and the previous change requests that have been applied in the network, thereby allowing for identification of a source of the incident and contributing to a deeper understanding of the network.

Further, since the above process is performed using machine learning models, complex information can be fully and comprehensively considered while reducing time and risk of error for identifying the correlations which also reduces impact on customer's experience. Furthermore, since all previous change requests are considered when identifying the correlations, the above process also allows for identification of correlations between the detected incident and the previous change requests regardless of how far back in time the previous change requests have been applied. The method then proceeds to operation S645.

At operation S645, the at least one processor may be configured to determine whether the detected incident is correlated to the current change requests and whether the detected incident is correlated to the previous change requests. According to example embodiments, the at least one processor may be configured to determine whether the detected incident is correlated to the current change requests and whether the detected incident is correlated to the previous change requests based on the generated correlation report. According to example embodiments, the at least one processor may be configured to determine whether the detected incident is correlated to the current change requests and whether the detected incident is correlated to the previous change requests using the one or more machine learning models.

Accordingly, based on determining that the detected incident is correlated to the current change requests or that the detected incident is correlated to the previous change requests, the method proceeds to operation S660. On the other hand, based on determining that the detected incident is not correlated to the current change requests and that the detected incident is not correlated to the previous change requests, the method proceeds to operation S650.

Accordingly, the above process allows for the system to automatically determine correlations between the detected incident and the current change requests that are being applied in the network and the previous change requests that have been applied in the network, and then accordingly inform the user or trigger an incident management process. Further, since the correlation is determined and analyzed using machine learning models based on comprehensive data, reliable and accurate prediction can be achieved.

At operation S650, the at least one processor may be configured to trigger an incident management (IM) process. According to example embodiments, the IM process may be triggered based on information from one or more of the incident management module, the performance monitoring module, and the fault management module. For example, the performance monitoring module may include an embedded ML/Anomaly detection module, where any anomalous KPI may be auto-detected, and auto-ticket may be created and shared with the Impact Management system as a trigger point of the IM process to start its flow for correlation with ongoing or previous change requests. In another example, the fault management module may include an auto-ticket function that may trigger the IM process. In further another example, the incident management module may include a ticket center, where the IM process may be triggered in response to a creation of a ticket by a system other than the Impact Management system (i.e., another system observers an issue and create a ticket).

At operation S660, the at least one processor may be configured to transmit the correlation report to a user. Accordingly, the user may review the correlation report to identify the cause of the incident (i.e., the current or previous change request) and determine appropriate actions to be done in response to the incident, such as rolling back the change request, and the like.

Upon performing operation S650 or S660, the method 600 may be ended or be terminated. Alternatively, method 600 may return to operation S610, such that the at least one processor may be configured to repeatedly perform, for at least a predetermined amount of time, the detecting the incident (at operation S610), the obtaining the information (at operation S620), the obtaining the current change requests and previous change requests (at operation S630), the generating the correlation report (at operation S640), the determining whether the detected incident is correlated to the current change requests and whether the detected incident is correlated to the previous change requests (at operation S645), the triggering the IM process (at operation S650), and the transmitting the correlation report (at operation S660).

For instance, the at least one processor may continuously (or periodically) detect more incidents in the network, and then restart the detecting the incident (at operation S610), the obtaining the information (at operation S620), the obtaining the current change requests and previous change requests (at operation S630), the generating the correlation report (at operation S640), the determining whether the detected incident is correlated to the current change requests and whether the detected incident is correlated to the previous change requests (at operation S645), the triggering the IM process (at operation S650), and the transmitting the correlation report (at operation S660).

To this end, the system of the present disclosure may manage impact of applying the change request to the target network element on the network, and identify if any of the change requests are correlated to an incident occurring in the network.

Example Implementation Environment

Figure 7:
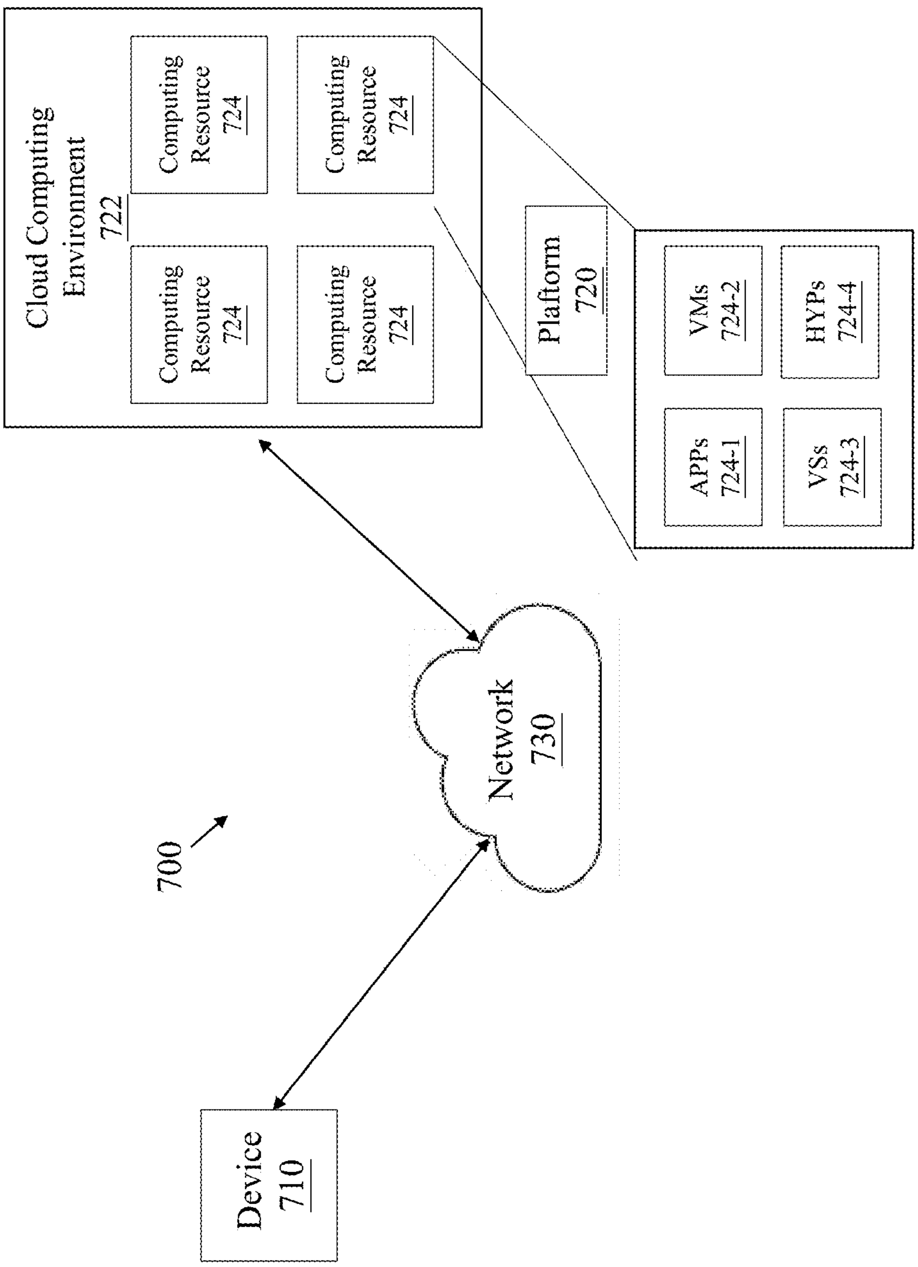
FIG. 7 illustrates a diagram of an example environment in which systems and/or methods, described herein, may be implemented.

FIG. 7 illustrates a diagram of an example environment 700 in which systems and/or methods, described herein, may be implemented. As shown in FIG. 7, environment 700 may include a device 710, a platform 720, and a network 730. Devices of environment 700 may interconnect via wired connections, wireless connections, or a combination of wired and wireless connections. In some embodiments, any of the functions and operations described with reference to FIG. 2 to FIG. 6 above may be performed by any combination of elements illustrated in FIG. 7.

Device 710 may include one or more devices capable of receiving, generating, storing, processing, and/or providing information associated with platform 720. For example, device 710 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, device 710 may receive information from and/or transmit information to platform 720.

Platform 720 includes one or more devices capable of receiving, generating, storing, processing, and/or providing information. In some implementations, platform 720 may include a cloud server or a group of cloud servers. In some implementations, platform 720 may be designed to be modular such that certain software components may be swapped in or out depending on a particular need. As such, platform 720 may be easily and/or quickly reconfigured for different uses.

In some implementations, as shown, platform 720 may be hosted in cloud computing environment 722. Notably, while implementations described herein describe platform 720 as being hosted in cloud computing environment 722, in some implementations, platform 720 may not be cloud-based (i.e., may be implemented outside of a cloud computing environment) or may be partially cloud-based.

Cloud computing environment 722 includes an environment that hosts platform 720. Cloud computing environment 722 may provide computation, software, data access, storage, etc. services that do not require end-user (e.g., user device 710) knowledge of a physical location and configuration of system(s) and/or device(s) that hosts platform 720. As shown, cloud computing environment 722 may include a group of computing resources 724 (referred to collectively as "computing resources 724" and individually as "computing resource 724").

Computing resource 724 includes one or more personal computers, a cluster of computing devices, workstation computers, server devices, or other types of computation and/or communication devices. In some implementations, computing resource 724 may host platform 720. The cloud resources may include compute instances executing in computing resource 724, storage devices provided in computing resource 724, data transfer devices provided by computing resource 724, etc. In some implementations, computing resource 724 may communicate with other computing resources 724 via wired connections, wireless connections, or a combination of wired and wireless connections.

As further shown in FIG. 7, computing resource 724 includes a group of cloud resources, such as one or more applications ("APPs") 724-1, one or more virtual machines ("VMs") 724-2, virtualized storage ("VSs") 724-3, one or more hypervisors ("HYPs") 724-4, or the like. While the current example embodiment is with reference to virtualized network functions, it is understood that one or more other embodiments are not limited to a particular type of cloud computing environment, and may be implemented in at least one of containers, cloud-native services, one or more container platforms, etc. For example, in one or more other example embodiments, any of the above-described components may be a software-based component deployed or hosted in, for example, a server cluster such as a hybrid cloud server, data center servers, and the like. The software-based component may be containerized and may be deployed and controlled by one or more machines, called "nodes", that run or execute the containerized network elements and are addressable. In this regard, a server cluster may contain at least one master node and a plurality of worker nodes, wherein the master node(s) controls and manages a set of associated worker nodes.

According to example embodiments, example embodiments described herein may be implemented or be deployed in the server platform described above, in the form of virtualized network function (VNF). In this regard, it is contemplated that the terms "virtual", "virtualized", or the like, described hereinabove are merely intended to specify the nature of the machine (and the elements and resources associated therewith) being provided in virtual or software form. In this regard, the "virtual machine", "virtualized storage", and the like, described hereinabove should not be limited to any specific type of virtual machine or virtual element. Accordingly, it can be understood that the (or operations associated therewith) may be defined or presented in the form of a containerized network function, of which the functions may be provided in the form of containers.

Application 724-1 includes one or more software applications that may be provided to or accessed by user device 710. Application 724-1 may eliminate a need to install and execute the software applications on user device 710. For example, application 724-1 may include software associated with platform 720 and/or any other software capable of being provided via cloud computing environment 722. In some implementations, one application 724-1 may send/receive information to/from one or more other applications 724-1, via virtual machine 724-2.

Virtual machine 724-2 includes a software implementation of a machine (e.g., a computer) that executes programs like a physical machine. Virtual machine 724-2 may be either a system virtual machine or a process virtual machine, depending upon use and degree of correspondence to any real machine by virtual machine 724-2. A system virtual machine may provide a complete system platform that supports execution of a complete operating system ("OS"). A process virtual machine may execute a single program, and may support a single process. In some implementations, virtual machine 724-2 may execute on behalf of a user (e.g., user device 710), and may manage infrastructure of cloud computing environment 722, such as data management, synchronization, or long-duration data transfers.

Virtualized storage 724-3 includes one or more storage systems and/or one or more devices that use virtualization techniques within the storage systems or devices of computing resource 724. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 724-4 may provide hardware virtualization techniques that allow multiple operating systems (e.g., "guest operating systems") to execute concurrently on a host computer, such as computing resource 724. Hypervisor 724-4 may present a virtual operating platform to the guest operating systems, and may manage the execution of the guest operating systems. Multiple instances of a variety of operating systems may share virtualized hardware resources.

Network 730 may include one or more wired and/or wireless networks. For example, network 730 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Various Aspects of Embodiments

According to example embodiments, in order to manage impact when applying changes in a network, the Impact Management system may generate a risk analysis report based on a method of procedure included in a change request and previous change requests using one or more machine learning models, where the risk analysis report may include data related to risks of applying the change request to the target network element on the network As a result, network elements in the network may be automatically mapped, which allows for identification and mitigation of potential risks when applying a change request to a target network element on the network, while taking into consideration comprehensive information to reduce time and risk of error for performing risk assessment The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s) module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Various further respective aspects and features of embodiments of the present disclosure may be defined by the following items:

Item [1]: An apparatus that may be configured to: receive a change request to be applied to a target network element in a network, wherein the change request may include at least a method of procedure specifying one or more changes to be applied to the target network; obtain one or more previous change requests that have been applied to the target network element and information related to the target network element; generate a risk analysis report based on the method of procedure and the obtained one or more previous change requests and information using one or more machine learning models; and determine whether to apply the change request to the target network element based on the generated risk analysis report using the one or more machine learning models; wherein the risk analysis report may include data related to risks of applying the change request to the target network element on the network.

Item [2]: The apparatus according to item [1], wherein the risk analysis report may include one or more of: a list of network elements in the network that are expected to be impacted by the application of the change request to the target network element; one or more change requests to be applied to other network elements in the network that are expected to conflict with the change request to be applied to the target network element; one or more activities that are expected to conflict with the change request to be applied to the target network element; one or more issues that are expected to occur with the change request to be applied to the target network element; network elements survival analysis; and one or more suggestions on an implementation timing of the change request.

Item [3]: The apparatus according to one of items [1]-[2], wherein the apparatus may be configured to: in response to determining to apply the change request to the target network element, apply the change request to the target network element; and in response to determining to not apply the change request to the target network element, transmit a deny notification to a user.

Item [4]: The apparatus according to item [3], wherein the apparatus may be further configured to: monitor statuses of the target network element and other network elements in the network in response to applying the change request to the target network element; and generate an impact analysis report based on the monitored statuses using the one or more machine learning models, wherein the impact analysis report may include data related to impacts of applying the change request to the target network element on the target network element and other network elements in the network.

Item [5]: The apparatus according to item [4], wherein the apparatus may be further configured to: determine whether a roll back should be performed on the target network element based on the generated impact analysis report using the one or more machine learning models; in response to determining to perform the roll back on the target network element, perform the roll back on the target network element; and in response to determining to not perform the roll back on the target network element, transmit a result notification to a user.

Item [6]: The apparatus according to one of items [1]-[5], wherein the one or more machine learning models may include one or more an aggregate model, a neighbor-based predictor, and time-to-event predictor.

Item [7]: The apparatus according to item [6], wherein the one or more machine learning models may be integrated together via feature fusion.

Item [8]: A method that may include: receiving a change request to be applied to a target network element in a network, wherein the change request may include at least a method of procedure specifying one or more changes to be applied to the target network; obtaining one or more previous change requests that have been applied to the target network element and information related to the target network element; generating a risk analysis report based on the method of procedure and the obtained one or more previous change requests and information using one or more machine learning models; and determining whether to apply the change request to the target network element based on the generated risk analysis report using the one or more machine learning models; wherein the risk analysis report may include data related to risks of applying the change request to the target network element on the network.

Item [9]: The method according to item [8], wherein the risk analysis report may include one or more of: a list of network elements in the network that are expected to be impacted by the application of the change request to the target network element; one or more change requests to be applied to other network elements in the network that are expected to conflict with the change request to be applied to the target network element; one or more activities that are expected to conflict with the change request to be applied to the target network element; one or more issues that are expected to occur with the change request to be applied to the target network element; network elements survival analysis; and one or more suggestions on an implementation timing of the change request.

Item [10]: The method according to item [8]-[9], wherein the method may further include: in response to determining to apply the change request to the target network element, applying the change request to the target network element; and in response to determining to not apply the change request to the target network element, transmitting a deny notification to a user.

Item [11]: The method according to item [10], wherein the method may further include: monitoring statuses of the target network element and other network elements in the network in response to applying the change request to the target network element; and generating an impact analysis report based on the monitored statuses using the one or more machine learning models, wherein the impact analysis report may include data related to impacts of applying the change request to the target network element on the target network element and other network elements in the network.

Item [12]: The method according to item [11], wherein the method may further include: determining whether a roll back should be performed on the target network element based on the generated impact analysis report using the one or more machine learning models; in response to determining to perform the roll back on the target network element, performing the roll back on the target network element; and in response to determining to not perform the roll back on the target network element, transmitting a result notification to a user.

Item [13]: The method according to one of items [8]-[12], wherein the one or more machine learning models may include one or more an aggregate model, a neighbor-based predictor, and time-to-event predictor.

Item [14]: The method according to item [13], wherein the one or more machine learning models may be integrated together via feature fusion.

Item [15]: A non-transitory computer-readable recording medium that may have recorded thereon instructions executable by an apparatus to cause the apparatus to perform a method including: receiving a change request to be applied to a target network element in a network, wherein the change request may include at least a method of procedure specifying one or more changes to be applied to the target network; obtaining one or more previous change requests that have been applied to the target network element and information related to the target network element; generating a risk analysis report based on the method of procedure and the obtained one or more previous change requests and information using one or more machine learning models; and determining whether to apply the change request to the target network element based on the generated risk analysis report using the one or more machine learning models; wherein the risk analysis report may include data related to risks of applying the change request to the target network element on the network.

Item [16]: The non-transitory computer-readable recording medium according to item [15], wherein the risk analysis report may include one or more of: a list of network elements in the network that are expected to be impacted by the application of the change request to the target network element; one or more change requests to be applied to other network elements in the network that are expected to conflict with the change request to be applied to the target network element; one or more activities that are expected to conflict with the change request to be applied to the target network element; one or more issues that are expected to occur with the change request to be applied to the target network element; network elements survival analysis; and one or more suggestions on an implementation timing of the change request.

Item [17]: The non-transitory computer-readable recording medium according to item [15]-[16], wherein the method may further include: in response to determining to apply the change request to the target network element, applying the change request to the target network element; and in response to determining to not apply the change request to the target network element, transmitting a deny notification to a user.

Item [18]: The non-transitory computer-readable recording medium according to item [17], wherein the method may further include: monitoring statuses of the target network element and other network elements in the network in response to applying the change request to the target network element; and generating an impact analysis report based on the monitored statuses using the one or more machine learning models, wherein the impact analysis report may include data related to impacts of applying the change request to the target network element on the target network element and other network elements in the network.

Item [19]: The non-transitory computer-readable recording medium according to item [18], wherein the method may further include: determining whether a roll back should be performed on the target network element based on the generated impact analysis report using the one or more machine learning models; in response to determining to perform the roll back on the target network element, performing the roll back on the target network element; and in response to determining to not perform the roll back on the target network element, transmitting a result notification to a user.

Item [20]: The non-transitory computer-readable recording medium according to one of items [15]-[19], wherein the one or more machine learning models may include one or more an aggregate model, a neighbor-based predictor, and time-to-event predictor.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. An apparatus comprising:

a memory and a processor, wherein the processor is configured to:

receive a change request to be applied to a target network element in a network, wherein the change request comprises at least a method of procedure specifying one or more changes to be applied to the target network element;

obtain, in response to the received change request, one or more previous change requests that have been applied to the target network element and information related to the target network element;

generate a risk analysis report based on the method of procedure and the obtained one or more previous change requests and the obtained information using one or more machine learning models, by inputting at least the one or more previous change requests obtained in response to the received change request to the one or more machine learning models for risk analysis of the received change request;

determine whether to apply the change request to the target network element based on the generated risk analysis report using the one or more machine learning models; and in response to determining to apply the change request to the target network element, applying the change request to the target network element, wherein the risk analysis report includes data related to risks of applying the change request to the target network element on the network, and wherein the information related to the target network element comprises performance metrics that are monitored for the target network element.

2. The apparatus according to claim 1, wherein the risk analysis report includes one or more of:

a list of network elements in the network that are expected to be impacted by the application of the change request to the target network element;

one or more change requests to be applied to other network elements in the network that are expected to conflict with the change request to be applied to the target network element;

one or more activities that are expected to conflict with the change request to be applied to the target network element;

one or more issues that are expected to occur with the change request to be applied to the target network element;

network elements survival analysis; and one or more suggestions on an implementation timing of the change request.

3. The apparatus according to claim 1, wherein the processor is further configured to:

in response to determining to not apply the change request to the target network element, transmit a deny notification to a user.

4. The apparatus according to claim 3, wherein the processor is further configured to:

monitor statuses of the target network element and other network elements in the network in response to applying the change request to the target network element; and generate an impact analysis report based on the monitored statuses using the one or more machine learning models, wherein the impact analysis report includes data related to impacts of applying the change request to the target network element on the target network element and other network elements in the network.

5. The apparatus according to claim 4, wherein the processor is further configured to:

determine whether a roll back should be performed on the target network element based on the generated impact analysis report using the one or more machine learning models;

in response to determining to perform the roll back on the target network element, perform the roll back on the target network element; and in response to determining to not perform the roll back on the target network element, transmit a result notification to a user.

6. The apparatus according to claim 1, wherein the one or more machine learning models include one or more of an aggregate model, a neighbor-based predictor, and a time-to-event predictor.

7. The apparatus according to claim 6, wherein the one or more machine learning models are integrated together via feature fusion.

8. A method comprising:

receiving a change request to be applied to a target network element in a network, wherein the change request comprises at least a method of procedure specifying one or more changes to be applied to the target network element;

obtaining, in response to the received change request, one or more previous change requests that have been applied to the target network element and information related to the target network element;

generating a risk analysis report based on the method of procedure and the obtained one or more previous change requests and information using one or more machine learning models, by inputting at least the one or more previous change requests obtained in response to the received change request to the one or more machine learning models for analysis;

determining whether to apply the change request to the target network element based on the generated risk analysis report using the one or more machine learning models; and in response to determining to apply the change request to the target network element, applying the change request to the target network element, wherein the risk analysis report includes data related to risks of applying the change request to the target network element on the network, and wherein the information related to the target network element comprises performance metrics that are monitored for the target network element.

9. The method according to claim 8, wherein the risk analysis report includes one or more of:

a list of network elements in the network that are expected to be impacted by the application of the change request to the target network element;

one or more change requests to be applied to other network elements in the network that are expected to conflict with the change request to be applied to the target network element;

one or more activities that are expected to conflict with the change request to be applied to the target network element;

one or more issues that are expected to occur with the change request to be applied to the target network element;

network elements survival analysis; and one or more suggestions on an implementation timing of the change request.

10. The method according to claim 8, further comprising:

monitoring statuses of the target network element and other network elements in the network in response to applying the change request to the target network element; and generating an impact analysis report based on the monitored statuses using the one or more machine learning models, wherein the impact analysis report includes data related to impacts of applying the change request to the target network element on the target network element and other network elements in the network.

11. The method according to claim 10, further comprising:

determining whether a roll back should be performed on the target network element based on the generated impact analysis report using the one or more machine learning models;

in response to determining to perform the roll back on the target network element, performing the roll back on the target network element; and in response to determining to not perform the roll back on the target network element, transmitting a result notification to a user.

12. The method according to claim 8, wherein the one or more machine learning models include one or more of an aggregate model, a neighbor-based predictor, and a time-to-event predictor.

13. The method according to claim 12, wherein the one or more machine learning models are integrated together via feature fusion.

14. A non-transitory computer-readable recording medium having recorded thereon instructions executable by an apparatus to cause the apparatus to perform a method comprising:

receiving a change request to be applied to a target network element in a network, wherein the change request comprises at least a method of procedure specifying one or more changes to be applied to the target network element;

obtaining, in response to the received change request, one or more previous change requests that have been applied to the target network element and information related to the target network element;

generating a risk analysis report based on the method of procedure and the obtained one or more previous change requests and information using one or more machine learning models, by inputting at least the one or more previous change requests obtained in response to the received change request to the one or more machine learning models for analysis;

determining whether to apply the change request to the target network element based on the generated risk analysis report using the one or more machine learning models; and in response to determining to apply the change request to the target network element, applying the change request to the target network element; and wherein the risk analysis report includes data related to risks of applying the change request to the target network element on the network, and wherein the information related to the target network element comprises performance metrics that are monitored for the target network element.

15. The non-transitory computer-readable recording medium according to claim 14, wherein the risk analysis report includes one or more of:

a list of network elements in the network that are expected to be impacted by the application of the change request to the target network element;

one or more change requests to be applied to other network elements in the network that are expected to conflict with the change request to be applied to the target network element;

one or more activities that are expected to conflict with the change request to be applied to the target network element;

one or more issues that are expected to occur with the change request to be applied to the target network element;

network elements survival analysis; and one or more suggestions on an implementation timing of the change request.

16. The non-transitory computer-readable recording medium according to claim 14, wherein the method further comprises:

in response to determining to not apply the change request to the target network element, transmitting a deny notification to a user.

17. The non-transitory computer-readable recording medium according to claim 16, wherein the method further comprises:

monitoring statuses of the target network element and other network elements in the network in response to applying the change request to the target network element; and generating an impact analysis report based on the monitored statuses using the one or more machine learning models, wherein the impact analysis report includes data related to impacts of applying the change request to the target network element on the target network element and other network elements in the network.

18. The non-transitory computer-readable recording medium according to claim 17, wherein the method further comprises:

determining whether a roll back should be performed on the target network element based on the generated impact analysis report using the one or more machine learning models;

in response to determining to perform the roll back on the target network element, performing the roll back on the target network element; and in response to determining to not perform the roll back on the target network element, transmitting a result notification to a user.

19. The non-transitory computer-readable recording medium according to claim 14, wherein the one or more machine learning models include one or more of an aggregate model, a neighbor-based predictor, and a time-to-event predictor.

* * * * *